Figure 8:
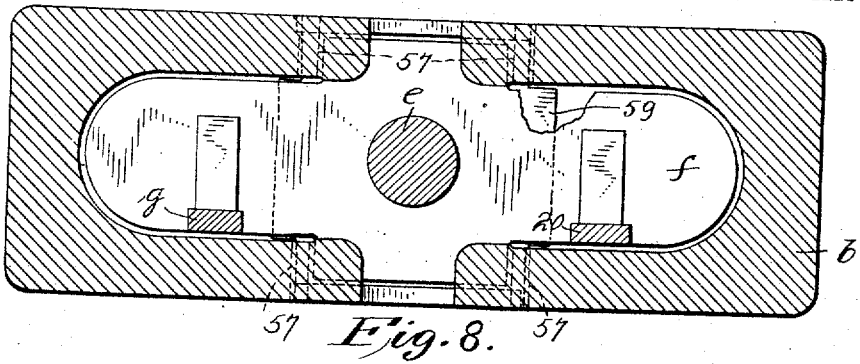

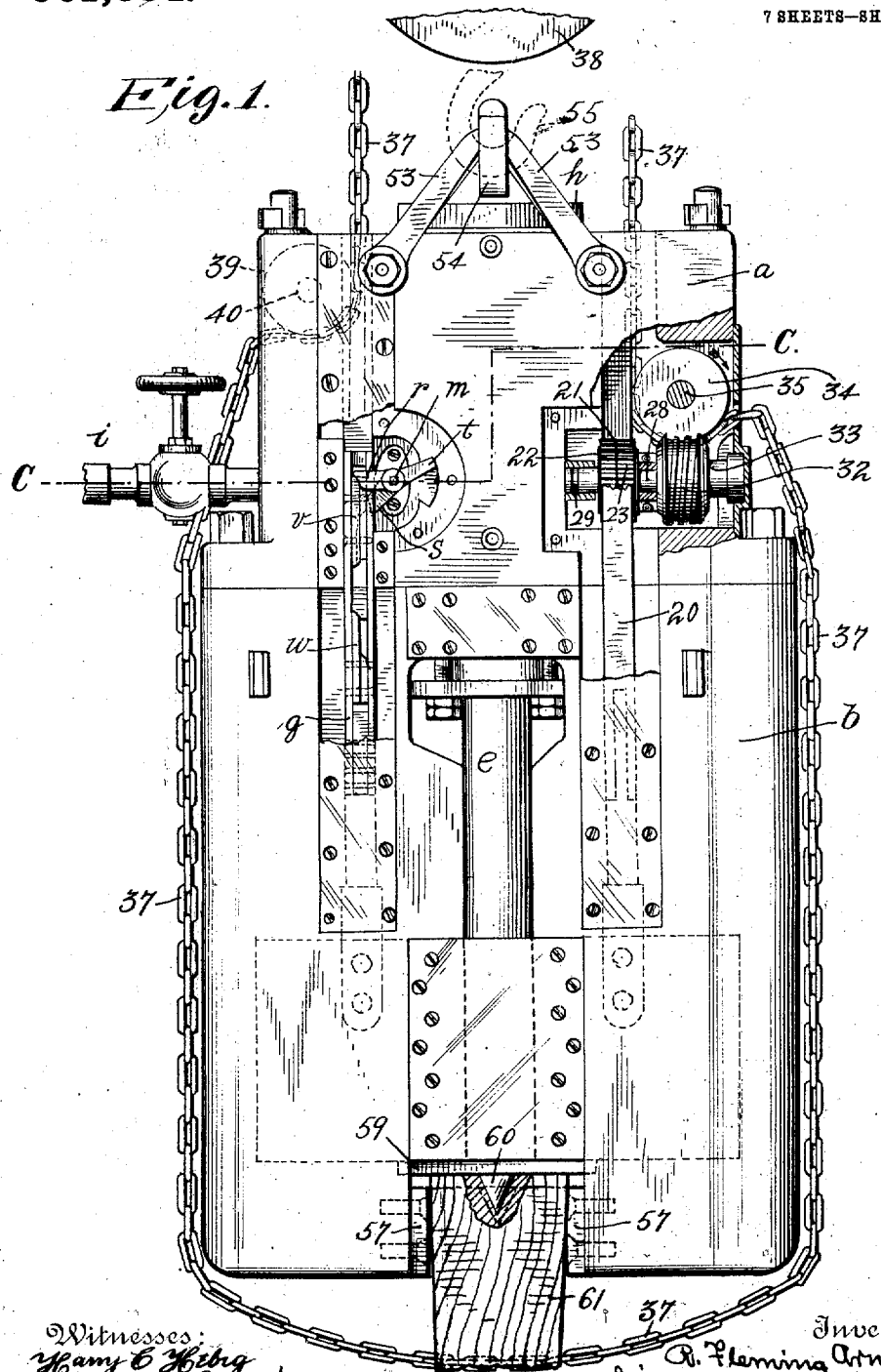

R. F. ARNOTT.
POWER OPERATED HAMMER.
APPLICATION FILED NOV. 4, 1907. RENEWED NOV. 13, 1909.
961,384.
Patented June 14, 1910.
7 SHEETS—SHEET 2.
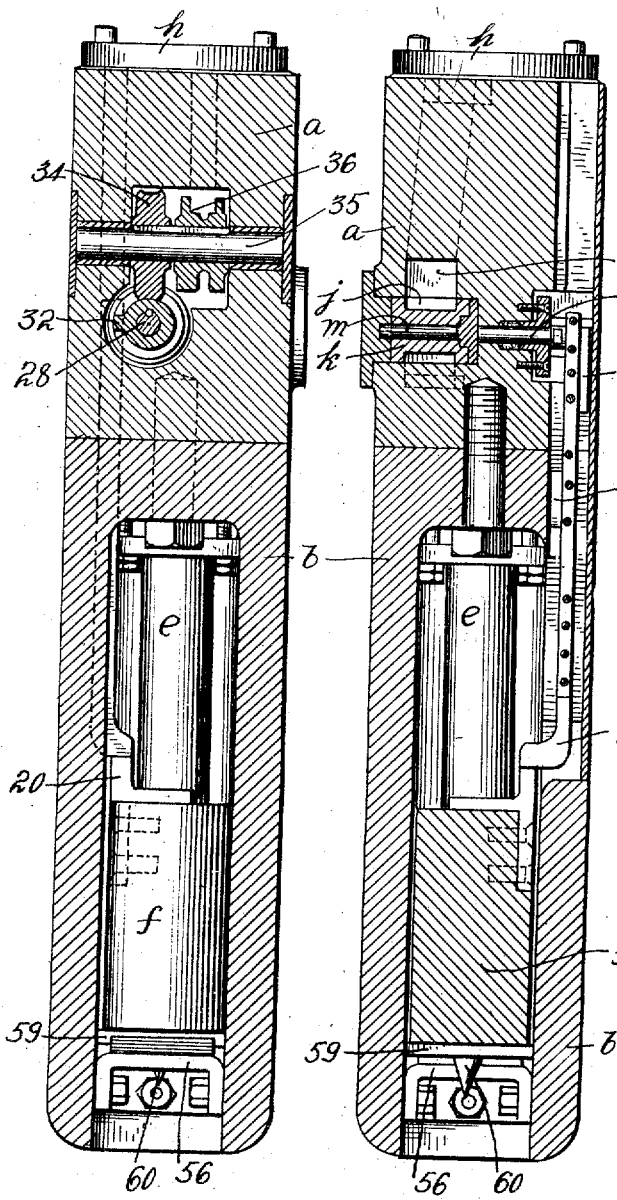
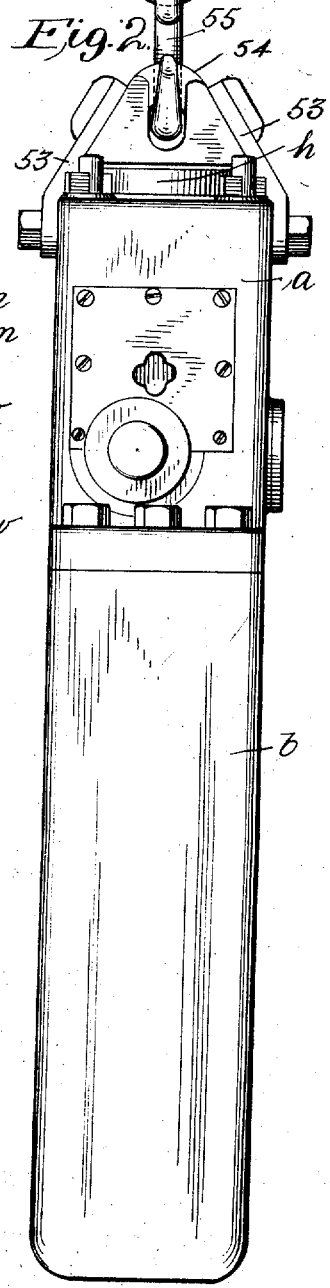

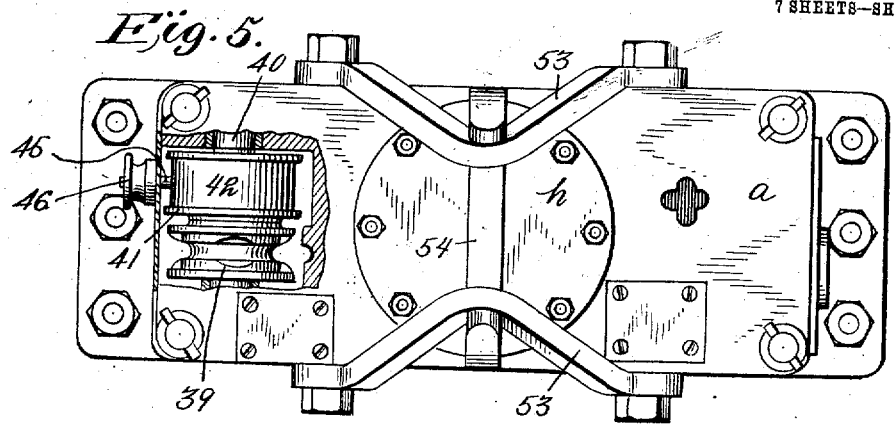
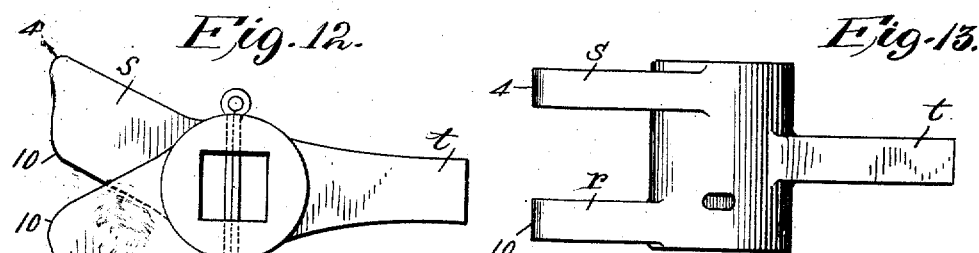
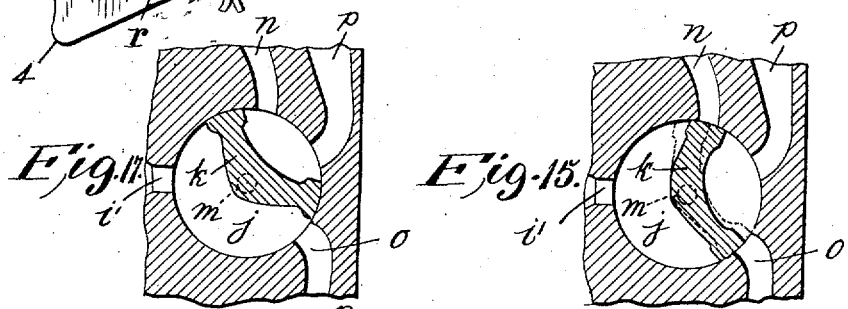
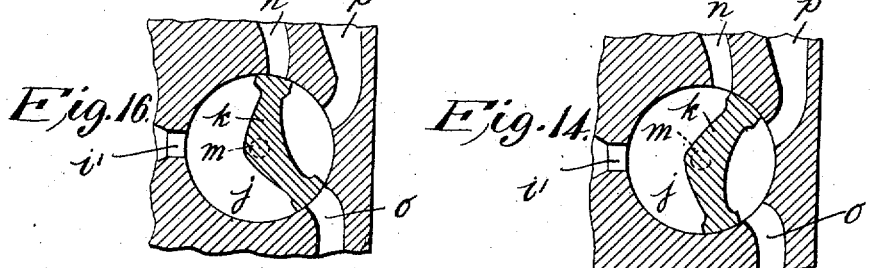

R. F. ARNOTT.
POWER OPERATED HAMMER.
APPLICATION FILED NOV. 4, 1907. RENEWED NOV. 13, 1909.
961,384.
Patented June 14, 1910.
7 SHEETS—SHEET 4.
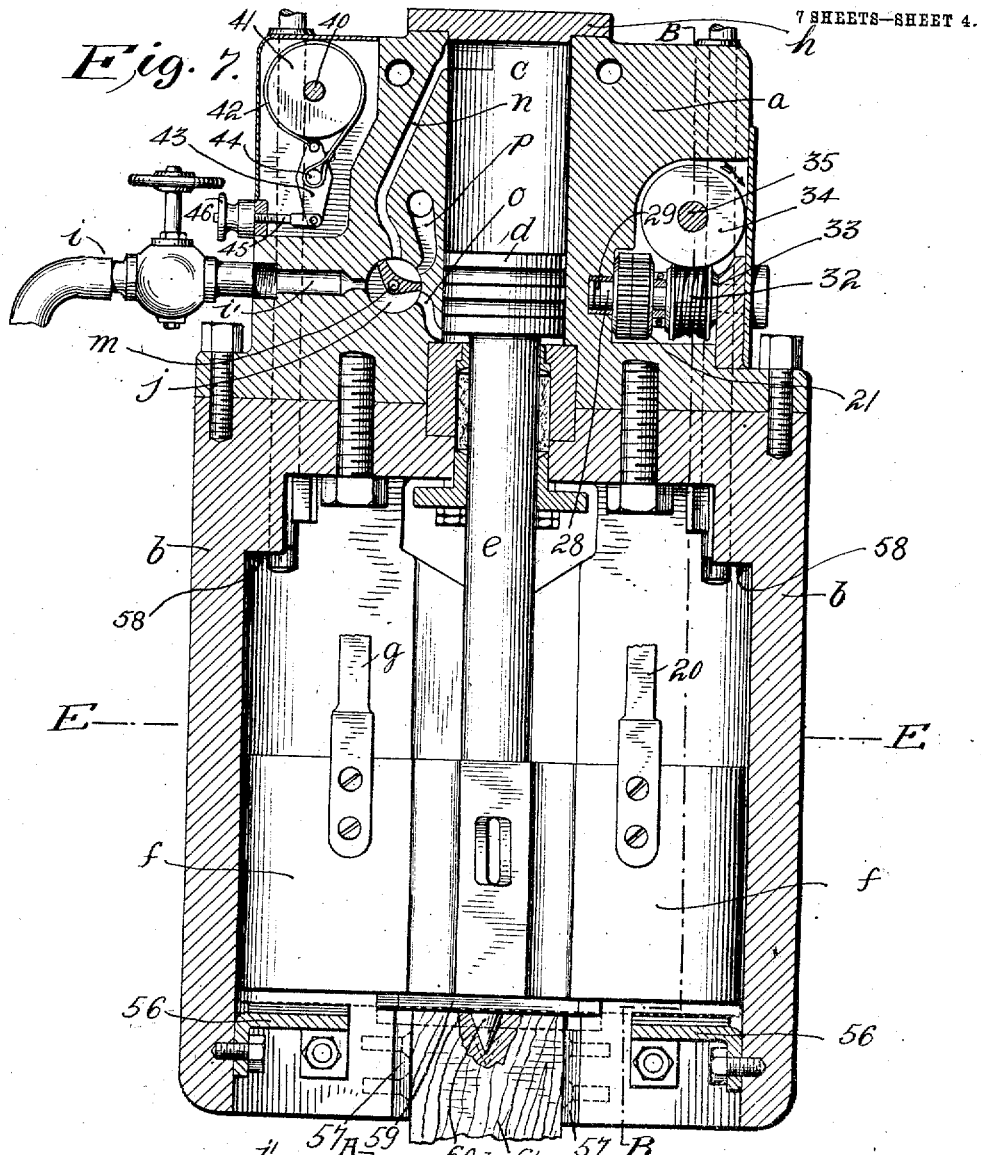
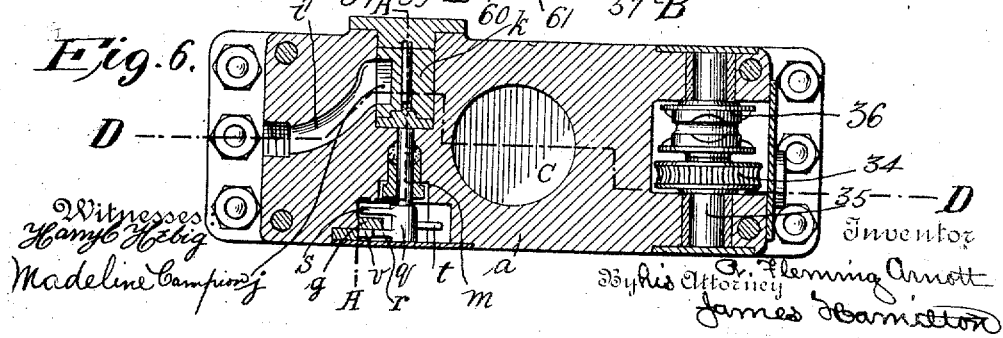
Witnesses
Harry Hebig
Madeline Camping
Inventor
R. Fleming Arnott
By his Attorney
James Hamilton R. F. ARNOTT.
POWER OPERATED HAMMER.
APPLICATION FILED NOV. 4, 1907. RENEWED NOV. 13, 1909.

961,384.

Patented June 14, 1910.
7 SHEETS—SHEET 5.

Witnesses:
Harry C. Hebig
Madeline Campion

R. Fleming Arnott, Inventor
By his Attorney
James Hamilton

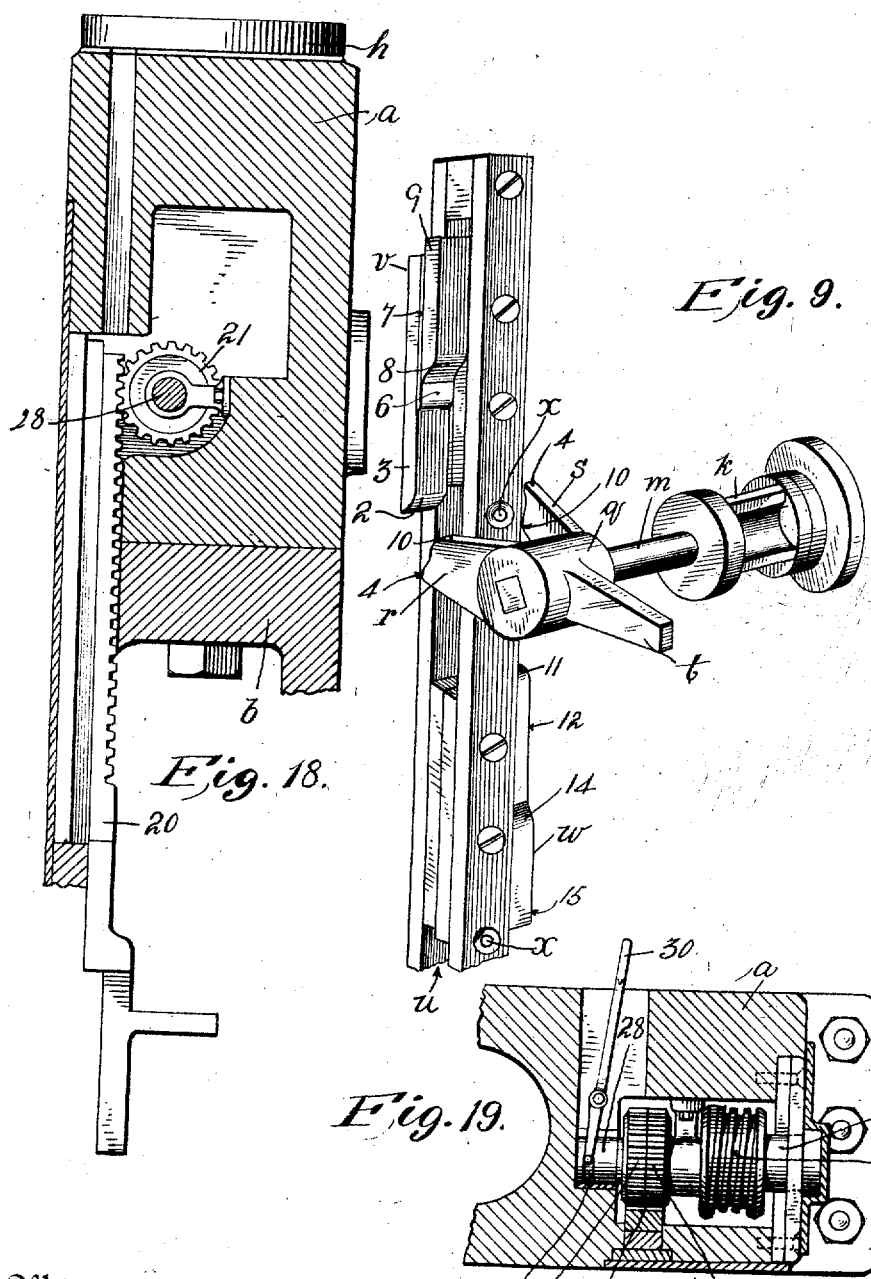

R. F. ARNOTT.
POWER OPERATED HAMMER.
APPLICATION FILED NOV. 4, 1907. RENEWED NOV. 13, 1909.
961,384.
Patented June 14, 1910.
7 SHEETS—SHEET 7.
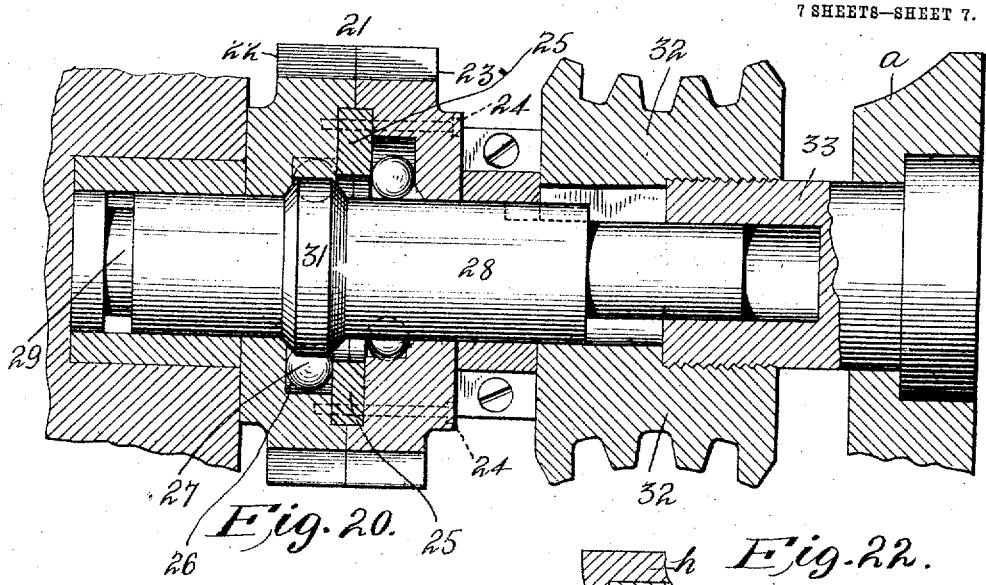
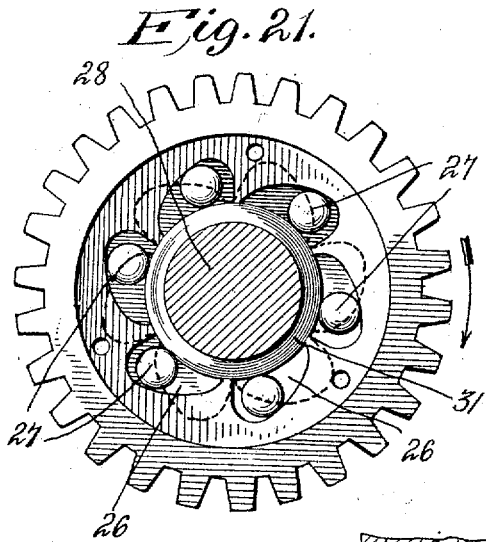
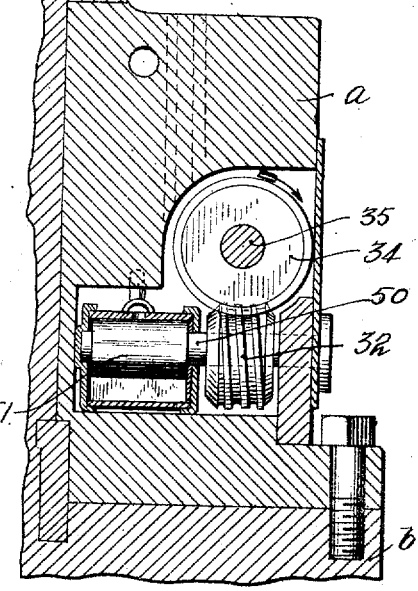
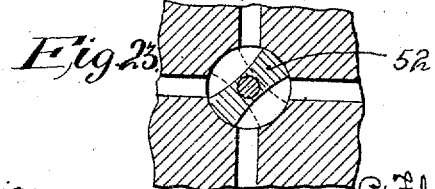

UNITED STATES PATENT OFFICE.

ROBERT FLEMING ARNOTT, OF MONTCLAIR, NEW JERSEY.

POWER-OPERATED HAMMER.

961,384.  Specification of Letters Patent.  Patented June 14, 1910.

Application filed November 4, 1907, Serial No. 400,547. Renewed November 13, 1909. Serial No. 527,901.

*To all whom it may concern:*

Be it known that I, ROBERT FLEMING ARNOTT, a subject of the King of Great Britain, residing at Montclair, in the county of Essex and State of New Jersey, have invented certain new and useful Improvements in Power-Operated Hammers, of which the following is a specification, reference being had to the accompanying drawings.

My invention relates to improvements in power-operated hammers; and an object of my invention is to provide a power-operated hammer which will be simple in construction and efficient in operation and which may be controlled and operated in use by a minimum number of workmen.

One feature of my invention resides in the provision of this class of hammers with means for obtaining an economical expenditure of the working fluid and with means for guarding against accident by cushioning the upward stroke of the ram. It has been common heretofore to provide power-operated hammers with rotative valves; but, so far as known to me, it is new with me to give such a rotative valve a step-by-step rotation. In my hammer hereinafter described, a valve-rod attached at one end to the ram-head carries valve-trips which are provided with cam surfaces adapted to rub against the projecting end of a valve-lever to produce cut-off and thereby allow the working fluid to expand; and to close the exhaust-port before the end of the stroke and thereby to compress the working fluid remaining in the cylinder and prevent any accidents which might follow a too great travel of the ram in an upward direction.

Another feature of my invention is the provision of a hammer of this class with massive frame members and cylinder body. The great weight of these stationary parts prevents the hammer as a whole from being raised by the reaction of the working fluid. Further, certain operating parts of the mechanism are inclosed within those heavy stationary parts and are thereby protected from being broken in the rough usage to which hammers of this class are subjected.

A third feature of my invention resides in providing a hammer of this class with means by which a hammer as a whole may be raised and lowered. These means are mounted within the massive stationary parts, (frame-members and cylinder body) and are protected from injury by them. A suspensory device, as a chain, is wound up by the engagement of a worm with a worm-wheel; and the latter by their engagement serve to lock the raising and lowering mechanism in any desired position. Further, means are hereinafter disclosed by which the reciprocations of the ram-head may be used to drive automatically the raising and lowering mechanism; and a frictionally-controlled device is provided for paying out the chain in case the hammer is not lowered with sufficient speed by this automatic mechanism. Again, the raising and lowering mechanism in my hammer is mounted below the top thereof, whereby head-room is saved and the hammer is adapted to be used where only limited head-room may be obtained, as in underground work and in shops.

Figure 10:
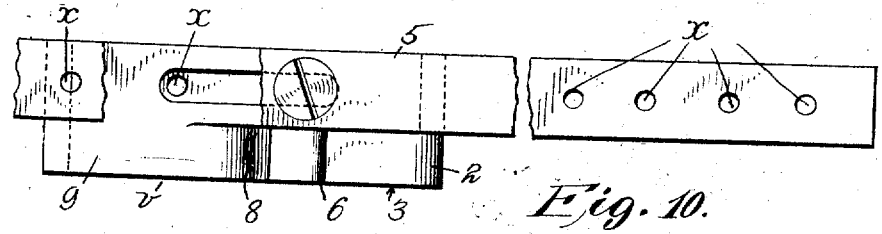
Figure 11:
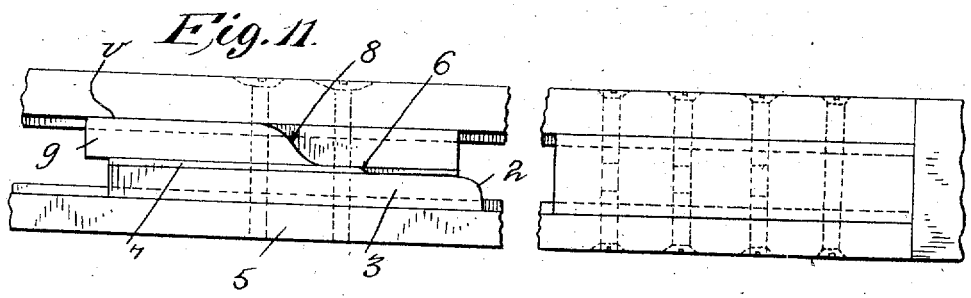

In the drawings illustrating the principle of my invention and the best mode now known to me of applying that principle, Figure 1 is a side elevation, parts of the cylinder body and of the frame being broken away to show the interior mechanism; Fig. 2 is an end elevation; Fig. 3 is a section on the line A—A of Fig. 6; Fig. 4 is a section on line B—B of Fig. 7; Fig. 5 is a plan view; Fig. 6 is a section on line C—C of Fig. 1; Fig. 7 is a section on line D—D of Fig. 6; Fig. 8 is a section on line E—E of Fig. 7; Fig. 9 is a detail in perspective showing the valve-operating mechanism; Figs. 10 and 11 are details of the valve-trip and the valve-rod carrying the same; Figs. 12 and 13 are details of the valve-lever; Figs. 14 to 17, inclusive, are details showing in sectional view different positions of the rotative valve; and Figs. 18 to 23, inclusive, are details of the mechanism for raising and lowering the hammer as a whole.

The cylinder-body $a$ is bolted to the frame members $b$ which together with the cylinder-body $a$ are of massive construction; and in the cylinder-body is formed a cylinder $c$ in which reciprocates a piston $d$ mounted upon one end of a piston-rod $e$ the other end of which carries the ram-head $f$ to which is fastened the valve-rod $g$. The moving parts consisting of the piston $d$, piston-rod $e$ and ram-head $f$ constitute the ram of the hammer. The cylinder $c$ is closed at its upper end by the cylinder-cover $h$.

The working fluid (*e. g.*, steam, air or the like) flows past the throttle-valve $i$ and through the passage $i'$ in the cylinder-body $a$ into the valve-chest $j$ in which is mounted the two-armed rotative valve $k$ carried by the valve-stem $m$. From the valve-chest $j$ lead the ports $n$, $o$ and the exhaust port $p$, the port $n$ leading to the upper end of the cylinder, while the port $o$ leads to the lower end thereof. (Fig. 7).

Upon the outer end of the valve-stem $m$ is mounted the hub $q$ of the valve-lever shown in Figs. 12 and 13. (See also Fig. 9.) The valve-lever is formed with the two trip-arms $r$, $s$ and the stop-arm $t$. The valve-rod $g$ is fastened at its lower end to the ram-head $f$ and is two-part at its upper end, the parts being separated by the slot $u$ in which are mounted the valve-trips $v$, $w$. Each of these valve-trips consists of a plurality of trip-plates which are adjustable relatively to one another. Further, the valve-trips $v$, $w$ themselves may be moved bodily along the slot $u$ the walls of which are formed with holes $x$ to admit of this adjustment, as is best shown in Fig. 10. But the valve-rod may be made integral with the valve-trips.

The action of the valve-trips in turning the valve $k$ may be described as follows: As the ram-head $f$ moves downwardly, carrying with it the valve-rod $g$, the valve-trip $v$ acts to throw the valve $k$ from the position shown in Fig. 14 to that illustrated in Fig. 15. In Fig. 14 the upper end of the cylinder is open to the admission of the working fluid through the port $n$, while the other end of the cylinder is open to the exhaust. In Fig. 15 the valve $k$ from its position has been turned counterclockwise until cut-off occurs at the upper end of the cylinder and the lower end of the cylinder is partially closed to the exhaust. This movement of the valve $k$ from its position shown in Fig. 14 to that shown in Fig. 15 is accomplished by the striking of the nose 2 of the trip-plate 3 against the toe 4 of the trip-arm $r$ of the valve-lever. As the ram-head $f$ continues its downward travel, the nose 6 of the trip-plate 7 strikes the same toe 4, of the trip-arm $r$ and thereby turns the valve-stem $m$ still farther, throwing the valve $k$ from the position shown in Fig. 15 to that illustrated in Fig. 16. In the latter figure both the ports $n$ and $o$ are closed by the arms of the valve, whereby expansion continues to take place at the upper end of the cylinder, while compression occurs at the lower end thereof. Further downward travel of the ram-head $f$ brings the nose 8 of the trip-plate 9 into engagement with the heel 10 of the trip-arm $r$, whereby the valve $k$ is thrown from its position in Fig. 16 to its position in Fig. 17. In the latter figure, the lower end of the cylinder is open for the admission of live steam and the upper end is open to the exhaust. As the ram-head moves upwardly, the nose 11 of the trip-plate 12 of the other trip $w$ strikes the toe 4 of the trip-arm $s$ and turns the valve $k$ from its position in Fig. 17 to its position in Fig. 16, in which both ports $n$, $o$ are closed and expansion takes place in the lower end of the cylinder, while compression takes place in the upper end thereof. As the upward movement of the ram-head continues, the nose 14 of the trip-plate 15 strikes the heel 10 of the trip-arm $s$ and throws the valve $k$ from its position in Fig. 16 to that of Fig. 14, wherein the steam is admitted through the port $u$ to the upper end of the cylinder, while exhaust steam flows through the port $o$ from the lower end. While the valve-trip $w$ is shown as being of different shape from the valve-trip $v$, both may be of the same shape, in which case the valve $k$ will be made to take the position shown by the dotted lines in Fig. 15 in passing from the position shown in Fig. 17 to that shown in Fig. 16.

In order that the ram-head $f$ may be made to raise and lower the hammer as a whole, the following mechanism is provided (see Figs. 18 to 23, inclusive): To the ram-head $f$ is fastened at its lower end a rack-bar 20 the teeth of which mesh with the teeth of a pinion 21. The latter is two-part, the parts 22, 23 being fastened together by the screws 24 and having interposed between them the partition ring 25. Each part 22, 23 of the pinion is formed in its interior with a plurality of recesses 26 in each of which is mounted free to roll a ball 27. The recesses of the part 22 are reversely disposed from those of the part 23, as is shown by the dotted lines in Fig. 21. The two-part pinion 21 is mounted upon the shaft 28 which is free to slide lengthwise and is formed with a circumferential groove 29 at one end. The inner end of a reversing lever 30 engages the walls of the groove 29 and serves to throw the shaft 28 lengthwise, when the lever 30 is operated. Upon the shaft 28 is formed an integral collar 31 the side faces of which are beveled (Fig. 20). When the collar 31 lies within the partition ring 25, the balls 27 lie upon the main or body portion of the shaft 28 and the whole pinion 21 is free to turn idly upon the shaft 28, as the ram-head reciprocates. When the shaft 28 is moved by the reversing lever 30 to the position shown in Fig. 20, the balls 27 of the part 22 are crowded or wedged by the collar 31 out into the recesses 26; and when the pinion 21 is rotated in the direction of the arrow in Fig. 21 (or clockwise), by the upward travel of the rack-bar 20, the balls 27 roll toward the smaller end of the recesses 26 and clutch the pinion 21 to the shaft 28. Hence, when the rack-bar moves upwardly, the shaft 28 is rotated, while (for this position of the collar 31) the return or downward movement of the rack-bar 20 will be idle, the pinion 21 will rotate idly and the shaft 28 will remain stationary. Keyed to the shaft 28 is a worm 32 the hub 33 of which is journaled in the cylinder body a (Figs. 19 and 20). In mesh with the worm 32 is the worm-wheel 34 fast on a shaft 35 which is journaled in the cylinder-body a (Figs. 4 and 6) and which carries a chain-wheel 36 with which engages an endless chain 37. The latter passes over a chain-wheel 38 secured to any suitable overhead support from which the hammer is suspended; and the chain 37 then passes under the chain-wheel 39 fast on the shaft 40 journaled in the cylinder body a (Figs. 1 and 5). Upon the shaft 40 is mounted a friction drum 41 around which passes the friction band 42 one end of which is fastened to an end of a brake-lever 43 fulcrumed upon a shaft 44 to which is secured the other end of the friction band 42. To the other end of the brake-lever 43 is pivotally fastened the inner end of a screw-rod 45 mounted upon the outer end of which is a brake-operating wheel 46. But any other suitable brake mechanism may be used. As the shaft 28 rotates in the direction of the arrow in Fig. 21, the worm 32 drives the worm-wheel 34 clockwise or in the direction of the arrow in Fig. 21 and the chain 37 will be fed upwardly at the right side as viewed in Fig. 1, thereby allowing the hammer as a whole to descend. Hence, upward movement of the ram-head f and its attached rack-bar 20 will lower away the hammer as a whole.

To raise the hammer as a whole, the workman throws the reversing lever and thereby moves the collar 31 within the part 23 of the pinion 21, forcing the balls 27 outwardly into the recesses 26 in the part 23. When the rack-bar 20 moves downwardly, the collar 31 being within the part 23, the pinion 21 will be rotated counterclockwise as viewed in Fig. 21 and thereby clutched to the shaft 28; and the latter will, therefore be rotated counterclockwise by the downward travel of the rack-bar 20 but will remain stationary during the upward travel thereof. Counterclockwise rotation of the shaft 28 will cause counterclockwise rotation of the worm-wheel 34, and the shaft 35 and the chain-wheel 36 will be rotated so as to draw downwardly the endless chain 37, on its right side as viewed in Fig. 1, whereby the hammer as a whole will be raised.

Instead of causing the ram to raise and lower the hammer as just described, there may be mounted upon a shaft 50 a rotary engine 51 of any suitable type driven by air or other suitable working fluid independently of the ram of the hammer. Upon the shaft 50, as is shown in Fig. 22, will be mounted a worm 32 which, as before, will mesh with a worm-wheel 34. To reverse the rotary engine 51, a four-way valve 52 is provided, as shown in Fig. 23.

As is best shown in Figs. 1, 2 and 5, the hammer is provided with bails 53 attached to the upper end of the cylinder body a and connected by a hanger-bar 54. Any suitable suspensory device as a hook 55 of a chain-block (not shown) may be engaged with the hanger-bar 54; and the chain-block may be carried by any suitable overhead support, as a traveling crane, boom of a derrick or the like. As the chain-block and the overhead support hereinbefore mentioned are old in this art and well known to those skilled therein, it is not deemed necessary to illustrate the same in the drawings.

Each of the frame members b is provided at its lower end with a buffer-plate 56 and with jaw-plates 57. The latter are detachable and may be replaced by other jaw-plates of different size and shape in order to vary the interval between the opposed faces of the jaw-plates according to the size and shape of the pile to be driven. Near its upper end, each frame member b is formed with shoulders 58 against which the ram-head f will rest in case the hammer is inverted.

At its bottom portion, the hammer is provided with a pile-plate 59, from which projects a tooth or pile-pin 60. The shape of the pile-plate 59 is shown by the dotted lines in Fig. 8. This pile-plate rests, when the hammer is not in use, upon the jaw-plates 57, as is shown by the dotted lines in Figs. 1 and 7.

To use the hammer, it is brought over the work to be operated upon as a pile 61 to be driven. As the hammer is lowered over the pile the top of the latter enters the space between the jaw-plates 57 and forces the pile-plate 59 from its dotted line position in Figs. 1 and 7 to its full line position in those figures. At the same time, the ram-head f is raised from off the buffer-plates 56 to the full line position of Figs. 1 and 7. The working fluid is then admitted through the throttle valve i and the passage i' to the valve-chest j. The ram is reciprocated, driving the pile downwardly. As the pile moves downwardly under the blows of the ram-head f, the hammer as a whole is made to follow it automatically through the upper movement of the rack-bar 20, which drives the worm 32 and worm-wheel 34, whereby the chain 37 is paid out. Should, however, the chain 37 not be paid out with sufficient rapidity to keep the hammer in close proximity to the pile, the workman throws the brake-operating wheel 46 so as to release the brake-band 42 and thereby to allow the friction-drum 41, the shaft 40 and the chain-wheel 39 to rotate and to pay out the chain 37 as fast as may be necessary. In case the rotary engine 51 is used, the rack-bar and the mechanism driven by it are dispensed with; and the hammer is lowered by the workman who controls the rotary engine and drives it as fast as may be necessary in either direction. Or the hammer may be raised or lowered bodily by an engine or by hand controlling the chain-block of which the hook 55 is a part.

The hammer is prevented from moving from front to rear by the engagement of the top of the pile 61 between the jaw-plates 57; and it is prevented from surging from side to side or in a direction parallel to the plane of the jaw-plates by the engagement of pile-pin 60 with the top of the pile and of the pile-plate 59 with the frame-members b, the pile-plate being shown by dotted lines in Fig. 8.

It will be observed that the rotative valve k is given a step-by-step rotary movement by the valve-trips v, w, whereby a more economical use of the working fluid is obtained and the movement of the hammer is cushioned. By the expansion of the working fluid after cut-off and its compression near the end of the stroke a higher efficiency is obtained; and by reason of the movement of the hammer at the end of its upward stroke being cushioned, danger of its striking the cylinder cover and wrecking the hammer is avoided,—a precaution which is essential in this class of hammers. So far as known to me, the rotative valves in power-operated hammers heretofore made have been thrown completely through their travel in one direction to admit the working fluid and then thrown in the reverse direction completely to their original position to open the end of the cylinder to exhaust; as, for instance, in the patent granted A. J. Dupuis, No. 341,837, May 11, 1886. By providing the valve-strips with a series of cam surfaces, the rotative valve is given a step-by-step rotation to produce cut-off and allow expansion of the working fluid and to close the exhaust before the end of the stroke to produce compression; a structure which is new with me in this class of hammers.

The massive construction of the stationary parts serves to give the hammer a solidity which prevents its being raised by the reaction of the working fluid in the cylinder. Further, the operating parts, as those concerned in the control of the valve and in the control of the raising and lowering mechanism, are inclosed within this massive construction and are protected by it from the hard usage and liability to be broken to which these hammers are subjected.

It will be noted that, in the mechanism for raising and lowering the hammer, a friction brake is used together with the automatic device, whereby the hammer as a whole may be lowered as rapidly as may be desired, should not the automatic lowering mechanism act with sufficient speed. Further, in this raising and lowering mechanism a worm and worm-wheel are used by the engagement of which a lock is produced that prevents any accidental unwinding of the suspensory chain. The raising and lowering mechanism is further mounted below the top of the hammer. This construction gives head-room and allows the hammer to be used in places, such as in shops and in tunnel work, where the head-room is limited. I am aware that mechanism for raising and lowering a hammer as a whole has heretofore been provided as is shown in the patent granted W. D. Van Duzee, No. 495,126, April 11, 1893; but, so far as known to me, I am the first to provide means controlled by the ram-head for automatically raising and lowering the hammer as a whole; and also the first to provide for the same purpose a device independent of the ram and mounted in and below the top of the stationary parts.

My hammer hereinbefore described may be operated and controlled by a minimum number of workmen, whereby the cost of operation is materially reduced.

I claim:

1. In a power-operated hammer, the combination with a cylinder; a piston which reciprocates therein; and a ram-head driven by said piston; of a rotative valve which controls the admission and the exhaust of the working fluid to and from said cylinder; and means for giving said valve a step-by-step motion of rotation to produce compression of the working fluid and thereby to cushion the piston at the end of its stroke.

2. In a power-operated hammer, the combination with a cylinder; a piston which reciprocates therein; and a ram-head driven by said piston; of a rotative valve which controls the admission and the exhaust of the working fluid to and from said cylinder; and means controlled by the movement of said ram-head for giving said valve a step-by-step motion of rotation to produce compression of the working fluid and thereby to cushion the piston at the end of its stroke.

3. In a power-operated hammer, the combination with a cylinder; a piston which reciprocates therein; and a ram-head driven by said piston; of a rotative valve which controls the admission and the exhaust of the working fluid to and from said cylinder; a valve-stem upon which is mounted said valve; a valve-lever upon said valve-stem; a valve-rod; and a valve-trip carried by said rod and reciprocated thereby; said valve-lever projecting into the path of travel of said valve-trip and being given thereby a step-by-step motion of rotation.

4. In a power-operated hammer, the combination with a cylinder; a piston which reciprocates therein; and a ram-head driven by said piston; of a rotative valve which controls the admission and the exhaust of the working fluid to and from said cylinder; a valve-stem upon which is mounted said valve; a valve-lever upon said valve-stem; a valve-rod; and a valve-trip carried and reciprocated by said valve-rod, said valve-trip being formed with a plurality of cam surfaces which contact with said valve-lever and give the same a step-by-step motion of rotation.

5. In a power-operated hammer, the combination with a ram-head and means for reciprocating the same, of frame-members within which is mounted said ram-head, and valve-operating mechanism carried by said ram-head and inclosed within and protected by said frame-members.

6. In a power-operated hammer, the combination with a ram-head and means for reciprocating the same, of frame-members within which is mounted said ram-head; and means controlling the raising and lowering of the hammer as a whole, said means being mounted within and protected by said frame-members.

7. In a power-operated hammer, the combination with a ram-head and means for reciprocating the same, of frame-members within which is mounted said ram-head; a cylinder-body mounted upon said frame-members; suspensory devices for supporting the hammer; and means connected with said suspensory devices and mounted within and protected by said cylinder-body for raising and lowering the hammer as a whole.

8. In a power-operated hammer, the combination with a ram-head and means for reciprocating the same, of stationary parts within which are mounted said ram-head and means; a suspensory device; and mechanism mounted in said parts below the top thereof for raising and lowering the hammer as a whole, whereby head-room for the hammer is obtained.

9. In a power-operated hammer, the combination with a ram-head and means for reciprocating the same, of stationary parts within which are mounted said ram-head and means; a suspensory device; a worm; a worm-wheel; and means for driving said worm and worm-wheel to wind up and pay out said suspensory device; the engagement of said worm and worm-wheel serving to lock the suspensory device against being accidentally paid out.

10. In a power-operated hammer, the combination with a ram-head and means for reciprocating the same, of mechanism connected with and controlled by said ram-head for raising and lowering the hammer as a whole.

11. In a power-operated hammer, the combination with a ram-head and means for reciprocating the same, of mechanism connected with and controlled by said means, for raising and lowering the hammer as a whole.

12. In a power-operated hammer, the combination with a ram-head and means for reciprocating the same, of automatic mechanism for raising and lowering the hammer as a whole; and means for reversing said mechanism.

13. In a power-operated hammer, the combination with a ram-head and means for reciprocating the same, of automatic mechanism for raising and lowering the hammer as a whole; and a device for frictionally controlling the speed of lowering of the hammer.

14. In a power-operated hammer, the combination with a ram-head and means for reciprocating the same, of automatic mechanism for raising and lowering the hammer as a whole; and a device for throwing said mechanism out of operation.

In witness whereof I have hereunto set my hand in the presence of the two undersigned witnesses at New York city, N. Y., this second day of November, A. D. 1907.

R. FLEMING ARNOTT.

Witnesses:
EMMA I. McCARTHY,
JAMES HAMILTON.